W. H. WHITEHEAD.
FLY KILLER.
APPLICATION FILED AUG. 12, 1910.
984,332.
Patented Feb. 14, 1911.
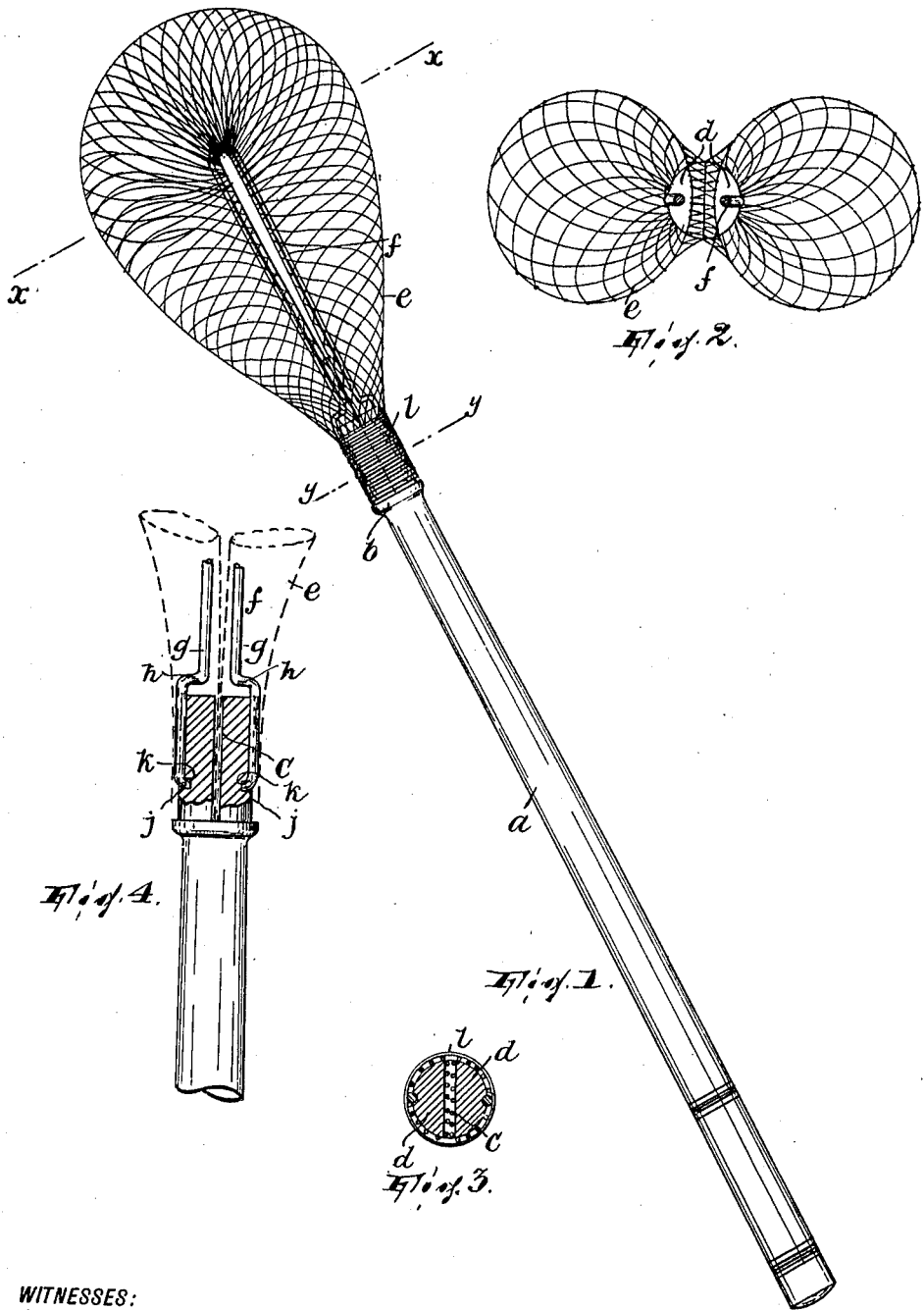

UNITED STATES PATENT OFFICE.

WILLIAM H. WHITEHEAD, OF PATERSON, NEW JERSEY.

FLY-KILLER.

984,332. Specification of Letters Patent. Patented Feb. 14, 1911.

Application filed August 12, 1910. Serial No. 576,888.

*To all whom it may concern:*

Be it known that I, WILLIAM H. WHITEHEAD, a citizen of the United States, residing in Paterson, Passaic county, New Jersey, have invented certain new and useful Improvements in Fly-Killers; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

A common form of device for destroying flies and other insects is a whisk or brush comprising a handle and a series of wire or other bristles disposed flatwise and serving to kill the insect when the same is struck therewith. One objection to this device is that it is calculated either to alarm the insect so that it escapes before the blow falls or directly removes it from its path on account of the air currents which it produces.

My object is to provide an insect destroyer of the kind indicated above which shall be free from this disadvantage and which at the same time will be simple, durable and inexpensive in construction.

In the accompanying drawing, Figure 1 is a plan view of the improved device: Fig. 2 a cross-sectional view on line *x—x* of Fig. 1; Fig. 3 a similar view on line *y—y* of said figure; and, Fig. 4 a slightly enlarged detail view, partly in section.

In the drawing, *a* is a suitable elongated handle having an annular shoulder *b* near one end (which is preferably cylindrical in cross-section), said end being bifurcated by being provided with a longitudinal slit C. extending approximately to the shoulder. Thus two semi-cylindrical stems *d, d* are formed.

To the handle is attached in the manner to be described the member *e* which serves directly in the destruction of the insects. It is preferably a tube woven from wire, or other suitable stiff and strong filaments, and having its ends tapering, as shown; the weave is open, as illustrated, so that in the use of the device there will result no appreciable disturbance of the air.

Each of the tapered ends of the member *e* is slipped over one of the stems *d, d* of the handle, to which it rather snugly fits. Previously, however, a reinforcing member *f* is operatively assembled with the member *e*. This member consists of a piece of wire or the like having suitable stiffness and bent midway between its ends back upon itself to produce the legs *g g* which at their extremities are bent first away from each other, as at *h h*, and then so as to extend parallel with each other, as at *i i*, their tips being turned inwardly, toward each other, as at *j j*. The members *e* and *f* are of course assembled when each is in the straight form, whereupon member *f* being bent back upon itself, as above described, it retains the member *e* in the substantially horse-shoe shape illustrated in the drawings.

Members *e* and *f* being shaped and assembled, as above described, the ends of member *e* are slipped over the stems *d d* while the portions *i i* of the legs of member *f* are arranged at the outsides of the stems *d d* into which their tips *j j* project as indicated at *k k*. Thereupon a stout binding wire *l* is wound about the several parts at the joint thus formed, securing them all firmly together.

It will be observed that the handle and reinforcing device *f* having the legs *g g* together form a supporting member for the member *e*, the parallel end portions of which supporting member serve not only as a reinforce for member *e* but, by being close together and disposed so as to penetrate longitudinally each end portion or leg of member *e*, to hold the latter portions or legs close together and impart increased stability to member *e*.

I do not wish to be limited to the exact construction herein shown and described, what I claim being.

1. The combination of an elongated handle member having one end bifurcated, and a rebent tubular impact member formed of stiff material and having its ends each embracing the portion of the stem at one side of the bifurcation in said stem, substantially as described.

2. The combination of an elongated handle member having a longitudinal slit in one end thereof, a rebent tubular impact member formed of stiff material and having its ends each embracing the stem at one side of said slit, and a binding means embracing the slitted end of the handle and the portions of the impact member receiving the same, substantially as described.

3. The combination of an elongated handle member having a longitudinal slit in one end thereof, a rebent tubular impact member formed of stiff material and having its ends each embracing the stem at one side of said slit, a rebent reinforcing member penetrating the impact member and having its ends bearing against the outer sides of the handle member, and a binding means embracing the slitted end of the handle and said ends of the impact and reinforcing members, substantially as described.

In testimony that I claim the foregoing I have hereunto set my hand this 11th day of August, 1910.

WILLIAM H. WHITEHEAD.

Witnesses:
JOHN W. STEWARD,
WM. D. BELL.